Jan. 13, 1931.  H. LEITNER ET AL  1,789,240
AIR SCREW
Filed Oct. 16, 1926  4 Sheets-Sheet 1

Inventors
Henry Leitner +
Henry C. Watts
By George A. Pruvost atty.

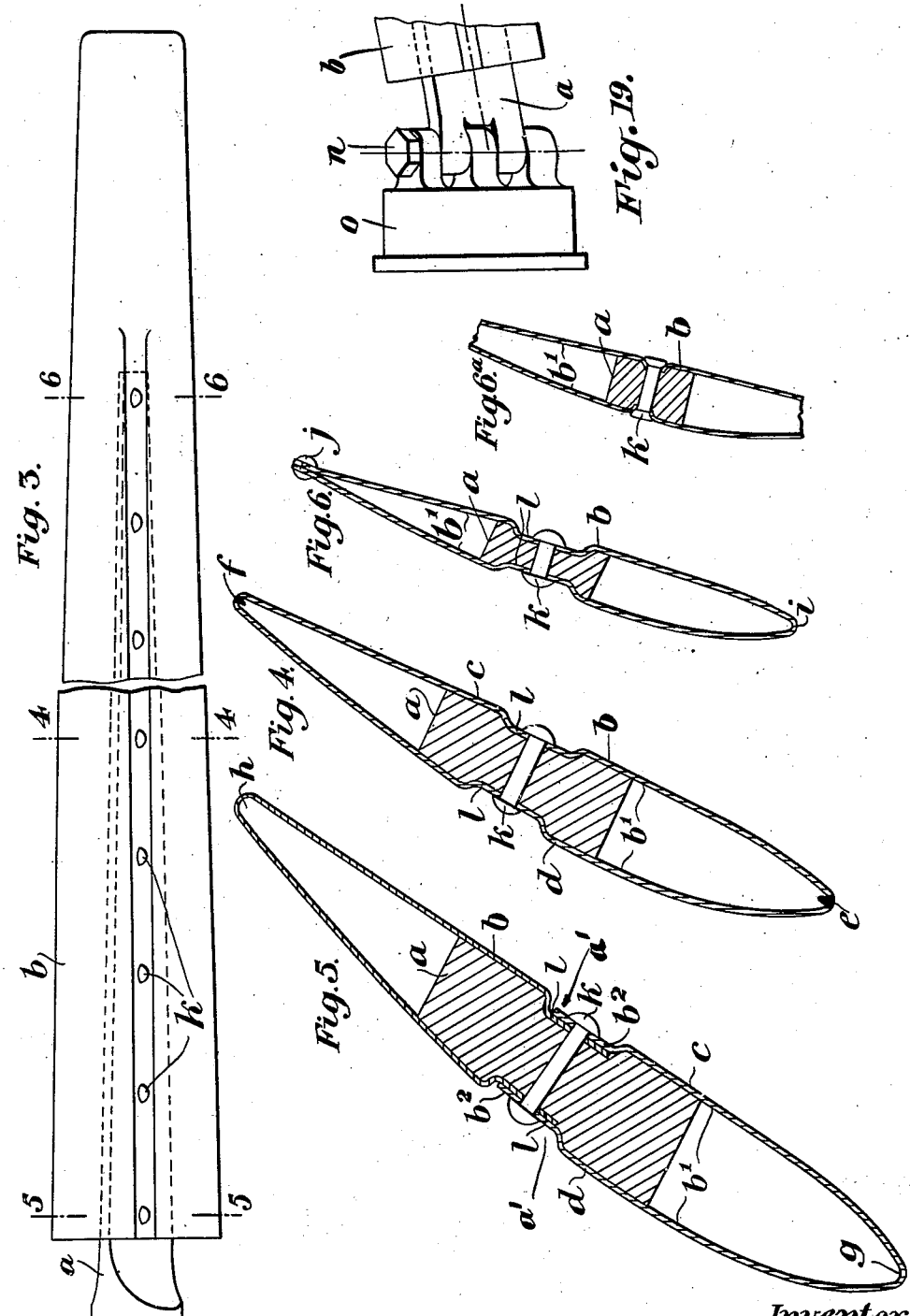

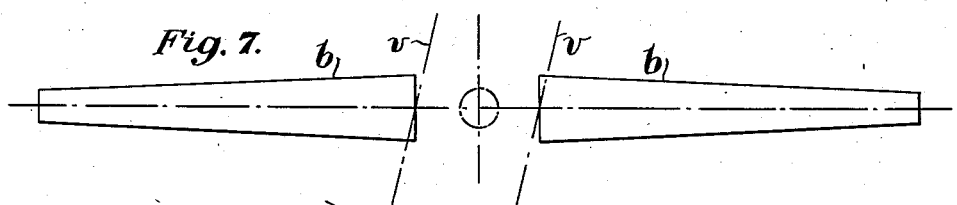
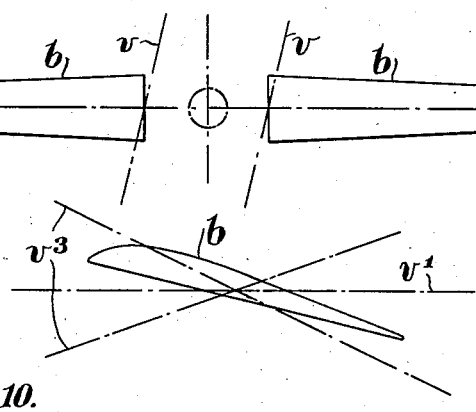
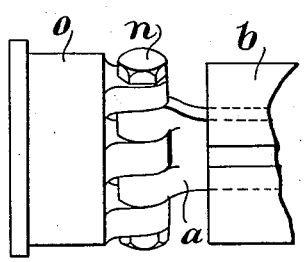
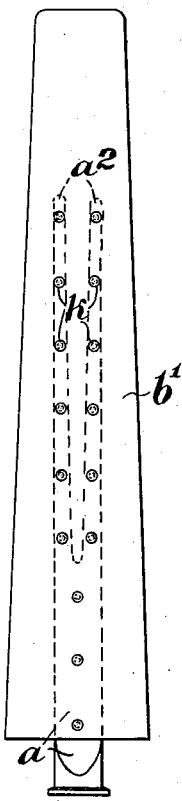
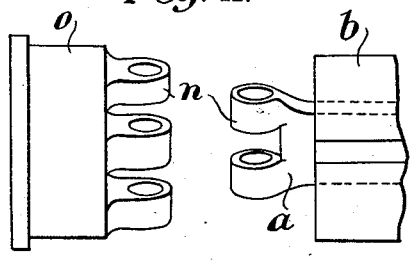
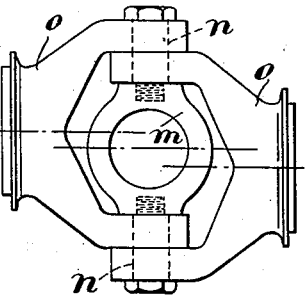
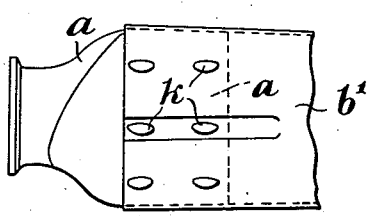

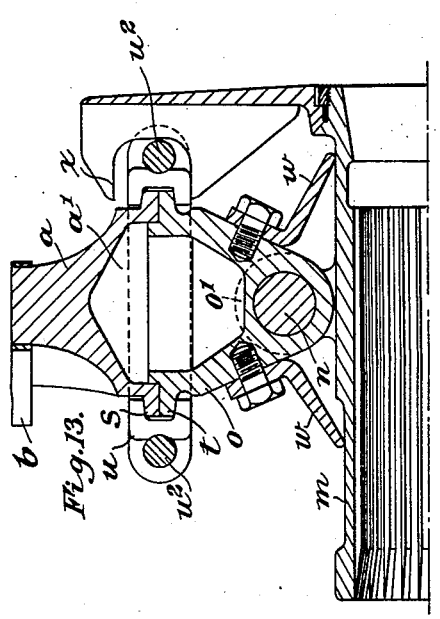
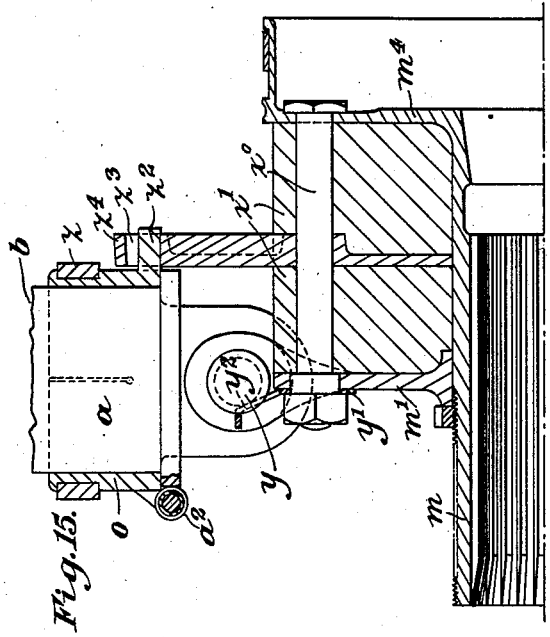
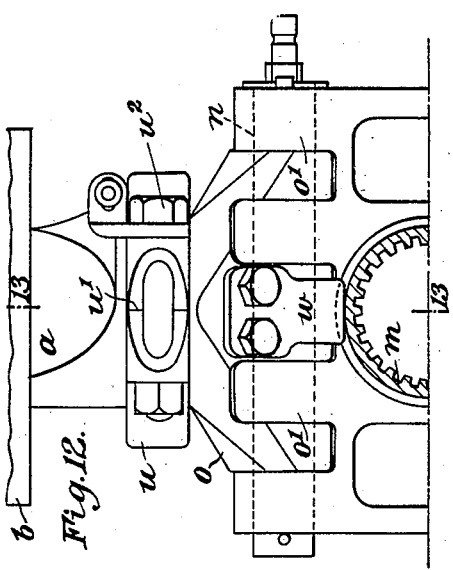
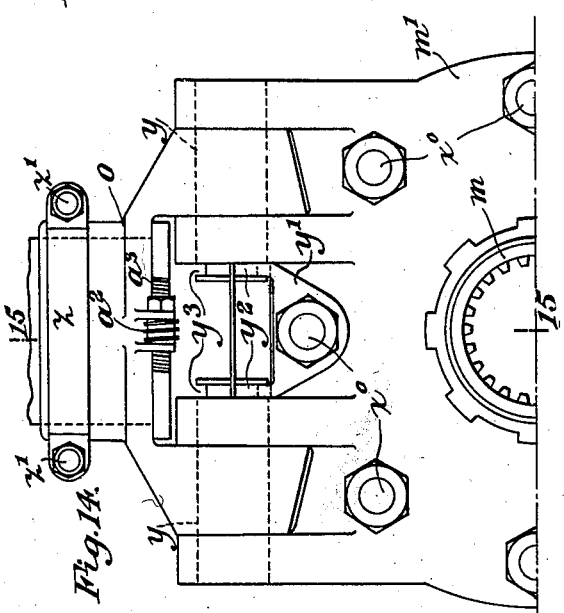

Patented Jan. 13, 1931

1,789,240

UNITED STATES PATENT OFFICE

HENRY LEITNER AND HENRY CHARLES WATTS, OF CROYDON, ENGLAND, ASSIGNORS TO METAL PROPELLERS LIMITED, OF LONDON, ENGLAND, A BRITISH JOINT-STOCK COMPANY.

AIR SCREW

Application filed October 16, 1926, Serial No. 142,081, and in Great Britain November 24, 1925.

The invention relates to air-screws with detachable blades and capable of adjustment around their longitudinal axes for alteration of pitch angle and it has mainly for its object to provide a light and strong air-screw in which is combined the double advantage of blades so hinged as to allow them automatically by centrifugal action to take up a position in which the principal bending moments are eliminated and of blades of which the pitch can be adjusted.

According to the invention, each blade of the air-screw comprises a single bar or a divided bar extending completely or partially from root to tip and made of a material possessing a high strength density ratio for example, high tensile steel or light aluminum alloy, and preferably tapered in width from root to tip. The said bar or bars may be enclosed or enveloped in a thin sheet or sheets of any suitable stiff material, preferably metal, which is or are secured to the bar or bars by any convenient means, such as riveting and forms or form the face and back surfaces of the blade; or the bar or bars may be so shaped as to have the necessary aerofoil cross-section without the use of the enveloping sheets.

The bar, whether single or divided and whether covered with sheets or not, lies approximately along radial lines from the axes of rotation of the air-screw, and at or near the root end is hinged to a hub through the medium of a connecting piece or member.

The type of hinge used may be of any type of bearing which allows the blade to set itself, or to be set, at the angle of inclination to the plane of rotation necessary to eliminate the principal bending moments.

The bar is adjustable around its axis in the hinged connecting member between the hub and the bar.

Where necessary the axis of the aforesaid hinge which secures the blade to the hub may be inclined to the central axis of the bar in such a manner as to enable the blade automatically to adjust its pitch under variations in thrust. Furthermore, in order to balance the torque on the blade, the axis of the hinge may be arranged to lie in a plane inclined to the plane of rotation. The axis of the bar or blade need not necessarily pass through the centre of rotation, but may pass to one side of it for the purpose of balancing the torque on the blade.

Whichever of these variations is or are adopted, the axis of the hinge or bearing must have a component which lies in a plane parallel to the plane of rotation and which is at right angles to the axis of the said blade thus enabling the blade, under the forces experienced by it when rotating, to set itself in such a way as to eliminate the principal bending moments.

To enable the invention to be fully understood we will describe it by reference to the accompanying drawing, in which:—

Figure 3 is a view of the complete blade detached from the hub.

Figure 4 is a section on the line 4—4, Figure 3.

Figures 5, 6 and 6a are views similar to Figure 4, illustrating slight modifications.

Figure 7 is a diagrammatic view in the axial direction of the supporting shaft of the blades of the improved air-screw illustrating a mode of hinging of the blades.

Figure 8 is an end view of the root end of one of the blades also illustrating a mode of hinging the same.

Figure 9 is an end elevation showing a common hinge for two blades.

Figure 10 is a side elevation of a construction of hinge for each blade and

Figure 11 is a view similar to Figure 10, but showing the parts of the hinge separated.

Figures 12 and 13 are views similar to Figures 1 and 2, respectively, illustrating a modification.

Figures 14 and 15 are also views similar to Figures 1 and 2, respectively, illustrating a further modification.

Figure 19 is a detail of the modification shown diagrammatically in Figure 7.

Figure 1:
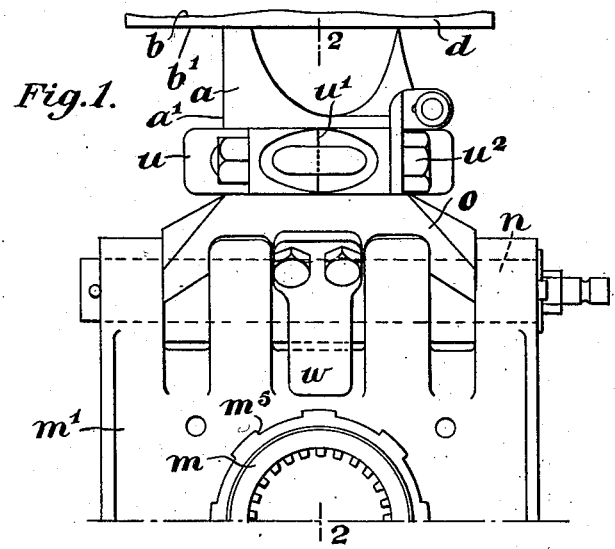
Figure 1 is an end view of a portion of one form of air-screw hub and detachable blade carried thereby, constructed in accordance with the invention.

Referring to Figures 1 to 4, $a$ is the bar preferably of taper form in width, extending longitudinally of each air-screw blade $b$, and approximately radially of the axis of rotation of the air-screw, the said bar being shown in Figure 3 as extending from the root of the blade nearly to the tip. $b^1$ is the sheet of stiff material, preferably metal, which encloses and is secured to the bar $a$ and forms the face $c$ and back $d$ for the blade $b$. In Figures 1 and 4, the enclosing sheet $b^1$ is made in two portions, which respectively form the face $c$ and back $d$, the edges of these portions being welded together as at $e$, $f$, to form, respectively, the leading and trailing edges of the blade.

In Figure 5 the sheet material $b^1$ is also made of two portions folded as at $g$ and $h$ to form, respectively, the leading and trailing edges of the blade, the edges of the two sheets overlapping each other as at $b^2$ and being secured to the bar $a$ in grooves $a^1$ thereof.

In Figure 6 the sheet material $b$ is in one piece folded as at $i$ to form the leading edge of the blade, the edges of the said sheet meeting together to form the trailing edge of the blade and being secured together. In the drawing, these edges are so secured by rivets $j$ but they may be secured together in any other suitable way, for instance, by welding.

In Figures 4, 5 and 6 the sheet material $b^1$ is secured to the bar $a$ by rivets $k$, the said bar being grooved along its two faces as at $l$ into which the sheet $b^1$ is fitted, so that the heads of the rivets do not project beyond the main portions of the said material forming the face and back of the blade. The material $b$ may, however, be secured to the bar in any other convenient manner, as, for example, as shown in Figure 6a which illustrates a construction similar to Figure 6 but in which the grooves in the bar are omitted.

As above stated the bar may be divided and such a construction is shown in Figure 17 in which $a^2$ indicates the said divided bar, each of the limbs of which is riveted to the enclosing envelope $b^1$. Also the said bar may be shortened so that it forms mainly a butt end fitting. This construction is shown in Figure 18. Again, the bar may be of a size such that it comprises the whole blade in which event the sheet is not required.

Figure 2:
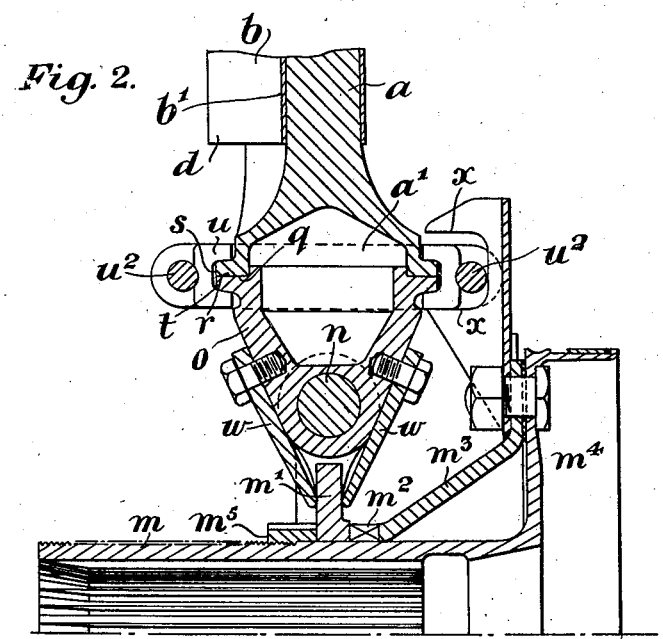
Figure 2 is a section on the line 2—2, Figure 1.

$m$, Figures 1 and 2, is the hub of the air-screw to which each blade thereof is hinged as at $n$ through the medium of the connecting piece or member $o$ to allow it to set itself at the inclination to the plane of rotation necessary to eliminate the principal bending moments, the hinge shown being of the knuckle type, with the part thereof connected to the hub in the form of a ring or plate $m^1$ fitting around the hub and keyed thereto by dogs $m^2$ engaging similar dogs on a coned driving portion $m^3$ attached to an enlarged part $m^4$ of the hub; the said dogs being held in engagement by a nut $m^5$ screwed on the hub as indicated.

The root $a^1$ of the bar $a$ and the connecting piece or member $o$ are respectively provided with circular butting faces $q$, $r$ coaxial with and in a plane at right angles to the axis of the said bar $a$ so that the latter can be rotated around its axis for adjustment for pitch angle, the said root end member being provided with flanges $s$, $t$, respectively, to enable them to be held in contact by an enclosing strap $u$ which is split as at $u^1$ to form two portions held together by bolts $u^2$.

The axis of the hinge of each blade $b$ of the air-screw is shown arranged at right angles to the common axis of the bar $a$ and member $o$ in the plane of rotation of the blades, but it may be arranged in a plane which is not at right angles to the said common axis, as shown in Fig. 19 and indicated by the dotted lines $v$, $v$ Figure 7, to enable the blade automatically to adjust its pitch under variations of thrust. Again, the axis of the hinge of each blade $b$ may be arranged at an angle to the plane of rotation $v^1$, Figure 8, as indicated at $v^3$, to balance the torque on the blade.

$w$, $w$ are the spring stops carried by the member $o$ and bearing on either side of the ring $m^1$ on the hub $m$ so as normally to maintain each blade with its axis at right angles to the axis of the hub.

By the described construction and arrangement of air-screw it will be seen that when it is turning in use the blades $b$ will, under centrifugal action, take up a position in which the principal bending moments are eliminated one of the spring stops yielding to allow of this.

$x$, $x$ are stops on the hub to limit the movement of the blade on its hinge in the event of failure of the spring stops $w$, the said stops coacting with the strap $u$.

Figure 9 illustrates an arrangement where the connecting members $o$ of the blades are hinged to the hub $m$ on a common axis, the two said members being forked as indicated and the axes of the blades out of alignment.

Figures 10 and 11 illustrate a construction where the hinge of each blade $b$ is formed between it and the connecting piece $o$, which latter is of cylindrical form designed to fit within a socket or bearing on the hub and to be adjusted therein for pitch angle all in the known manner.

The construction illustrated in Figures 12 and 13 is similar to that illustrated in Figures 1 and 2, except that the ring $m^1$ is dispensed with, the member $o$ being hinged directly to the hub $m$ which is formed with the appropriate knuckle portions $o^1$. The spring stops in this arrangement coact with the exterior surface of the said hub.

Figure 16:
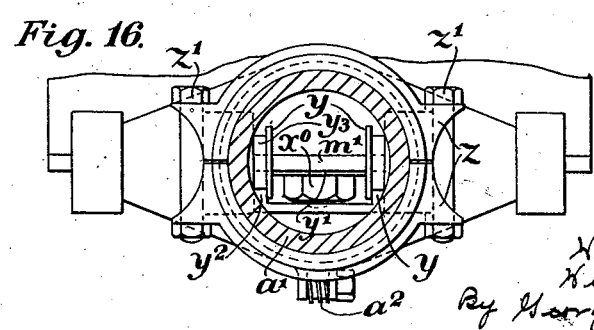
Figure 16 is a plan view of the arrangement shown in Figures 14 and 15, and Figures 17 and 18 are elevations illustrating further modifications.

Figures 14 to 16 illustrate a form of hub in which the coned driving piece $m^3$, Figures 1 and 2, is dispensed with, the ring $m^1$ being connected to the enlarged part $m^4$ of the hub by bolts $x^0$, $x^0$, wood blocks or distance-pieces $x^1$, $x^1$, being arranged between the said ring $m^1$ and the part $m^4$.

In this arrangement the hinge pins $y$ are adapted for easy removal and are held in position by a plate $y^1$ secured to the ring $m^1$ by one of the bolts $x^0$, the said plate being forked to provide prongs $y^2$ which engage grooves $y^3$ in the bolts $y$. By detaching the plate $y^1$ from the ring $m^1$ the prongs will be removed from the grooves $y^3$ so that the hinge pins $y$ can be slid endwise out of the knuckle joints of the hinge.

In the arrangement illustrated in Figures 14 to 16 we have shown the member $o$ in the form of a spring socket to receive the cylindrical root $a^1$ of the bar $a$ and in which the latter can be rotated for adjustment of the pitch angle of the blade by a worm $a^2$ engaging teeth $a^3$ on the said root, the said socket being tightened on the root after such adjustment by the split strap $z$ and bolts $z^1$, $z^1$. In this arrangement the stops for limiting the hinging movement of the blade on the hinge pins $y$, comprise a projection $z^2$ engaging a slot $z^3$ in a plate $z^4$ arranged between the two blocks $x^1$ and engaged by the bolts $x^0$ passing through the said blocks.

Claims:

1. An air-screw comprising blades, a hub and a member connecting each blade to the hub, the said blades being rotatably mounted on said connecting members about the longitudinal axes of said blades, whereby they are adjustable for variations of pitch, said connecting members being hinged to said hub, whereby said blades take up a position under centrifugal action, in which the principal bending moments are eliminated.

2. An air-screw comprising blades, a hub and a member connecting each blade to the hub, the said blades being rotatably mounted on said connecting members about the longitudinal axes of said blades, whereby they are adjustable for variations of pitch, said connecting members being hinged to said hub, whereby said blades take up a postion under centrifugal action, in which the principal bending moments are eliminated, the axis of the hinge of each blade being inclined to the axis of the blade so that the blade is enabled to automatically adjust its pitch angle under variations of thrust.

3. An air-screw comprising blades, a hub and a member connecting each blade to the hub, the said blades being rotatably mounted on said connecting members about the longitudinal axes of said blades, whereby they are adjustable for variations of pitch, said connecting members being hinged to said hub, whereby said blades take up a position under centrifugal action, in which the principal bending moments are eliminated, the axis of the hinge of each blade being arranged to lie in a plane inclined to the plane of rotation, to balance the torque on the blade.

4. An air-screw comprising blades, a hub and a member connecting each blade to the hub, the said blades being rotatably mounted on said connecting members about the longitudinal axes of said blades, whereby they are adjustable for variations of pitch, said connecting members being hinged to said hub, whereby said blades take up a position under centrifugal action, in which the principal bending moments are eliminated, and stops for limiting the movement of each blade on its hinge.

5. An air-screw comprising blades, a hub and a member connecting each blade to the hub, the said blades being rotatably mounted on said connecting members about the longitudinal axes of said blades, whereby they are adjustable for variations of pitch, said connecting members being hinged to said hub, whereby said blades take up a position under contrifugal action, in which the principal bending moments are eliminated, the part hinged to the hub being hinged through the medium of a ring secured to the hub.

6. An air-screw comprising a hub, a plurality of hinge members on said hub, each having a circular flange secured thereto, a plurality of blades having circular flanges at their root ends, each being adapted to abut the corresponding flange on the respective hinge members and means for securing said hinge and blade flanges together in such a manner that the latter may be rotated about their axes, whereby the blades are hinged to said hub at their root ends so that they take up a position when working, in which the principal bending moments are eliminated, and are adjustable around their longitudinal axes for variations of pitch angle.

7. An air-screw comprising a hub, a plurality of hinge members on said hub, each having a circular flange secured thereto, a plurality of blades having circular flanges at their root ends, each being adapted to abut the corresponding flange on the respective hinge members, a split strap member, and bolts for retaining said member in place, for securing said hinge and blade flanges together in such a manner that the latter may be rotated about their axes, whereby the blades are hinged to said hub at their root ends so that they take up a position when working, in which the principal bending moments are eliminated, and are adjustable around their longitudinal axes for variations of pitch angle.

HENRY LEITNER.
HENRY CHARLES WATTS.